UNITED STATES PATENT OFFICE.

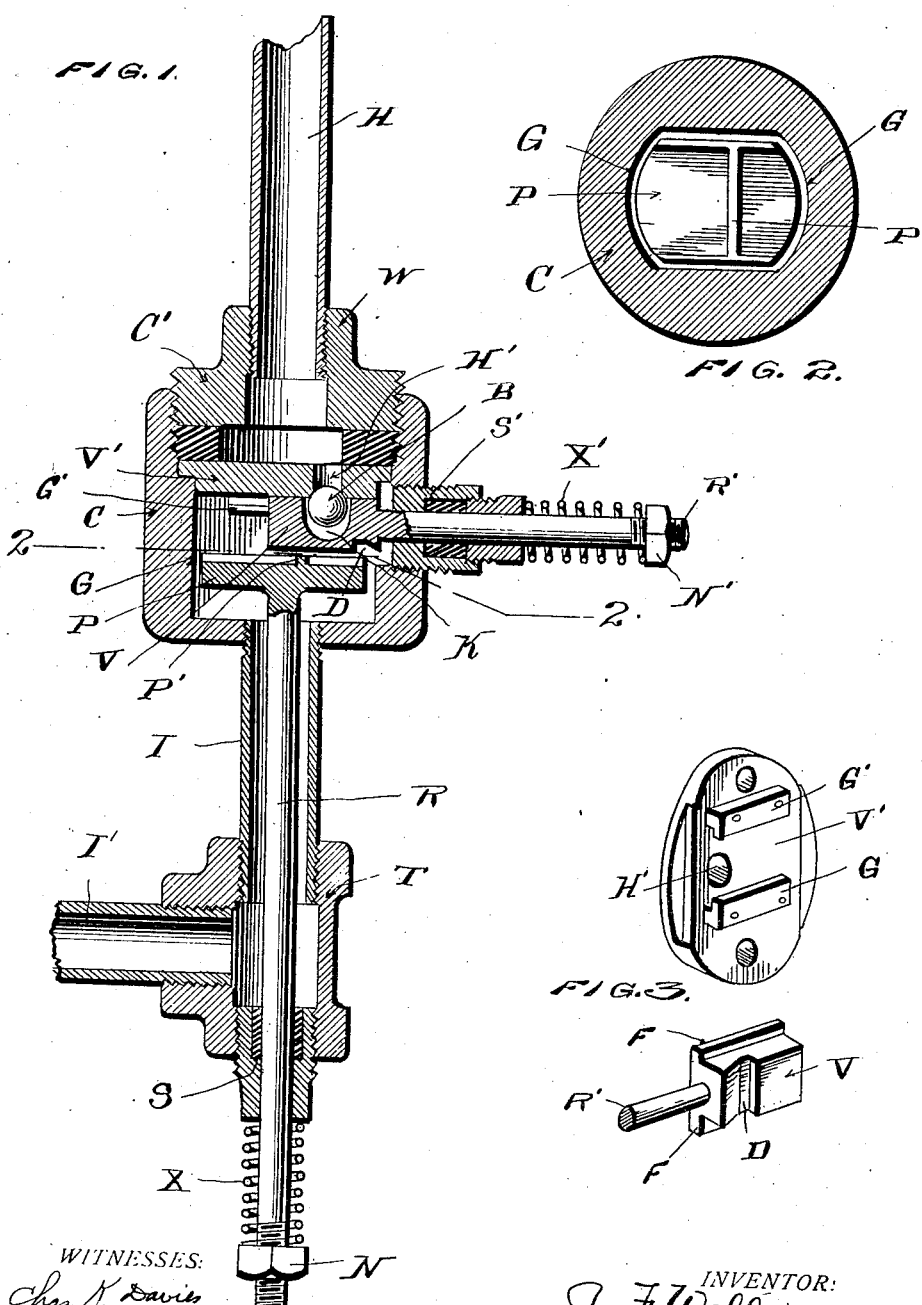

JOSEPH F. WELLS, OF PINKSTAFF, ILLINOIS.

GAS CUT-OFF.

No. 904,662.

Specification of Letters Patent.

Patented Nov. 24, 1908.

Application filed April 30, 1908. Serial No. 430,159.

*To all whom it may concern:*

Be it known that I, JOSEPH F. WELLS, a citizen of the United States, and resident of Pinkstaff, Lawrence county, State of Illinois have invented certain new and useful Improvements in Gas Cut-Offs, and my preferred manner of carrying out the invention is set forth in the following full, clear, and exact description, terminating with claims particularly specifying the novelty.

This invention relates to gas fittings, and more especially to automatic cut-offs, and its object is to produce a safety cut-off to be located between the service pipe and the house connections and to contain a check valve which will close automatically upon the decrease of the service pressure and will remain closed until it is opened by hand.

To this end the invention consists broadly in a spring actuated check valve movable at right angles to a pressure actuated piston, and means for manually engaging the two when the valve is open, and it consists specifically in the details of construction for carrying out the broad idea—all as illustrated in the drawings wherein—

Figure 1 is a central vertical section of this cut-off complete; Fig. 2 is a horizontal section on the line 2—2 of Fig. 1; Fig. 3 is a perspective detail of the parts of the check valve removed.

In the drawings the letter I' designates the service pipe and H the house connections, between which is located a casing C of somewhat larger diameter than the connecting pipes that lead into its bottom and out of its top in my preferred construction, the inlet pipe I being here shown as connected with the service by a T-joint T. The construction of all these parts and the details of the casing further than as necessary to the mechanism described below are unimportant. Vertically through the inlet I is disposed a rod R carrying a piston P within the casing which moves therein between guides G so as to permit the passage of the inflowing gas by it in sufficient volume to supply the house connections, as best seen in Fig. 2; and the lower end of the rod R extends through a stuffing box S and is surrounded by an expansive spring X between said box and a nut N on the rod, which spring with the weight of the rod and piston tends to move the latter downward within the casing. Horizontally within the casing C moves the check valve V preferably having flanges F moving in guides G' on the under side of the valve seat V' within the casing, and the stem R' of this valve extends outward through a stuffing box S' and is surrounded by an expansive spring X' between said box and nut N' on the stem, which spring has a normal tendency to draw the valve to the position shown in Fig. 1 where it closes communication between the service pipe and house connections in any suitable manner.

By preference I form a hole H' in the valve seat V' out of line but communicating with the pipe H beneath the top plate C' of the casing, which plate may be conveniently formed in the shape of a flange screwed into the casing and onto the pipe H by a wrench hold W. The valve seat V' may be conveniently supported within the casing upon the guides G. By preference I employ a ball B resting within a cup K formed in the upper side of the valve V, which ball is of a size to close the lower end of the hole H' and so light in weight that almost any flow of gas through this cut off with the parts in the position shown in Fig. 1 will chuck the ball upward and close said hole. By preference I form a projection P' on the piston P and a notch or depression D in the lower face of the valve V at a point to be engaged by the projection when the valve is pressed inward and the hole H' is open, but it will be obvious that the projection P' might engage the front corner of the valve or the projection and notch could be transposed.

In operation the check valve is pushed inward by hand against the force of the spring X', and the rod R is raised by hand against the force of the spring X so that the projection P' engages the notch D and holds the valve V in position to leave the hole H' open. The gas now flowing through the device exerts a certain pressure upward upon the piston, and the nut N is set so that the spring X will not overcome this pressure. In use it will be found that the latter retains the parts in this position, even if all jets in the house connections are closed, and when they are again opened the parts still retain this position. If now the pressure should decrease, as it often does to such an extent as to extinguish the jets at night or when the family is absent, the spring X will cause the descent of the piston so that the projection will disengage the notch, when the spring X' will immediately move the check valve V to the position shown in Fig. 1 with the ball B beneath the hole H'. Thereafter if the pressure again increases (which without a device of this kind would cause the open jets in the house connections to leak) the gas flowing through my improved cut-off will chuck the ball B up against the lower end of the hole in the valve seat and close communication to the pipe H—the rise of the piston upon or resumption of pressure merely causing the projection P' to bear against the valve beyond the notch D. When the operator awakes or returns and finds this condition existing, he has but to press the stem R' inward when the projection will automatically engage the notch as will be understood, and if necessary he may assist in its reëngagement by pressing upward on the rod R.

As above stated, details of construction are unimportant except as they assist in carrying out the general idea. The parts are preferably entirely of metal, and the joints or connections are suitably packed to prevent leakage under the customary pressure. The rods may be provided with knobs at their outer ends, and against the nuts may be jam nuts—all for purposes which will be obvious. The sizes of parts will be proportionate to the service.

What is claimed as new is:

1. In an automatic cut-off, the combination with a casing between the service and house connections, and a pressure-actuated piston moving loosely therein but never closing the inlet; of a check valve movable therein at right angles to the movements of the piston, a valve seat having a hole, devices on the piston and valve adapted to detachably engage when the latter uncovers said hole, and means independent of the piston for normally moving the valve into position to close said hole.

2. In an automatic cut-off, the combination with a casing between the service and house connections, and a piston movable loosely therein; of a check valve movable therein at right angles to the movements of the piston, a valve seat having a hole, a projection on the piston and a notch in the valve with which it detachably engages when the valve uncovers the hole, and a spring for normally moving the valve into position to close said hole.

3. In an automatic cut-off, the combination with a casing between the service and house connections, and a piston movable loosely therein; of a check valve movable therein at angles to the movements of the piston, a valve seat having a hole communicating with the outlet, the valve having a cup adapted to pass under said hole, a ball in the cup adapted to close the hole under gas pressure, devices on the piston and valve adapted to detachably engage when the latter uncovers said hole, and means for normally moving the valve into position to close said hole.

4. In an automatic cut-off, the combination with a casing between the service and house connections, and a pressure-actuated piston moving loosely therein; of a check valve movable therein at right angles to the movements of the piston, a valve seat having a hole communicating with the outlet, the valve having a cup adapted to pass under said hole, a ball in the cup adapted to close the hole under gas pressure, a projection on the piston and a notch in the valve with which it detachably engages when the valve uncovers the hole, and means for normally moving the valve into position to close said hole.

5. In an automatic cut-off, the combination with a casing between the service and house connections, and a piston movable loosely therein; of a check valve movable therein at right angles to the movements of the piston, a valve seat having a hole out of line with the outlet, devices on the piston and valve adapted to detachably engage when the latter uncovers said hole, the stem of the valve projecting outside the casing and having a nut, and an expansive spring between said nut and casing for normally moving the valve into position to close said hole.

6. In an automatic cut-off, the combination with a casing between the service and house connections, and a piston moving loosely therein; of a check valve movable therein at right angles to the movements of the piston, a valve seat having a hole out of line with the outlet, the valve having a cup adapted to pass under said hole, a ball in the cup adapted to close the hole under gas pressure, a projection on the piston and a notch in the valve with which it detachably engages when the valve uncovers the hole, the stem of the valve projecting outside the casing and carrying a nut, and an expansive spring between said nut and casing for normally moving the valve into position to close said hole.

7. In an automatic cut-off, the combination with a casing between the service and house connections, and a pressure-actuated piston moving loosely therein; of a check valve movable therein at right angles to the movements of the piston, a valve seat having a hole out of line with the outlet, a projection on the piston and a notch in the valve with which it detachably engages when the valve uncovers the hole, the stems of the valve and piston projecting through stuffing boxes outside of the cut-off, and expansive springs on said stems tending to draw the piston against the inlet pressure and the valve into position to normally close said hole.

In testimony whereof I have hereunto subscribed my signature this the 23rd day of April, A. D. 1908.

JOSEPH F. WELLS.

Witnesses:
JOHN H. McCABE,
CHAS. T. SEITZINGER.